US012138705B2

(12) United States Patent
Williams

(10) Patent No.: US 12,138,705 B2
(45) Date of Patent: Nov. 12, 2024

(54) PLASMA CUTTING SYSTEM WITH DUAL ELECTRODE PLASMA ARC TORCH

(71) Applicant: Lincoln Global, Inc., Santa Fe Springs, CA (US)

(72) Inventor: Christopher J. Williams, Norham (GB)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 618 days.

(21) Appl. No.: 17/377,587

(22) Filed: Jul. 16, 2021

(65) Prior Publication Data
US 2023/0012660 A1    Jan. 19, 2023

(51) Int. Cl.
*B23K 10/00*    (2006.01)
*B23K 31/10*    (2006.01)
(Continued)

(52) U.S. Cl.
CPC ............ *B23K 10/006* (2013.01); *B23K 31/10* (2013.01); *B23K 35/228* (2013.01);
(Continued)

(58) Field of Classification Search
CPC .... B23K 10/006; B23K 31/10; B23K 35/228; B23K 37/0247; H05H 1/34; H05H 1/42; H05H 1/44
(Continued)

(56) References Cited

U.S. PATENT DOCUMENTS 3,770,935 A * 11/1973 Tateno ............... H05H 1/26
219/121.52
4,143,260 A * 3/1979 Backstrom .......... B23K 9/1675
219/121.36
(Continued)

FOREIGN PATENT DOCUMENTS

DE    10 2011 053 106 A1    8/2012
EP       2 865 478 A2         4/2015
(Continued)

OTHER PUBLICATIONS

Naval Surface Warfare Center; "Application of Plasma ARC to Bevel Cutting;" MARAD Project SP-1-500; Report Dated 1979; Accessed on Nov. 3, 2020; pp. 1-62.
(Continued)

*Primary Examiner* — Jimmy Chou
(74) *Attorney, Agent, or Firm* — Brad C. Spencer

(57) ABSTRACT

A plasma cutting system includes a power supply that outputs first and second plasma cutting currents. A torch is connected to the power supply and includes a first cathode that receives the first plasma cutting current, a first electrode and swirl ring, a second cathode that receives the second plasma cutting current, and a second electrode and swirl ring. The torch simultaneously generates a first and second plasma arcs from the electrodes. A gas controller is configured to separately control a flow of a first plasma gas to the first swirl ring and a flow of a second plasma gas flow to the second swirl ring. A torch actuator moves the torch during cutting, and includes a motor having a hollow shaft rotor for rotating the torch during cutting. A motion controller is operatively connected to the torch actuator to control movements of the torch during cutting.

17 Claims, 7 Drawing Sheets

(51) Int. Cl.
  *B23K 35/22* (2006.01)
  *B23K 37/02* (2006.01)
  *H05H 1/34* (2006.01)
  *H05H 1/42* (2006.01)
  *H05H 1/44* (2006.01)

(52) U.S. Cl.
  CPC ...... *B23K 37/0211* (2013.01); *B23K 37/0247* (2013.01); *H05H 1/34* (2013.01); *H05H 1/42* (2013.01); *H05H 1/44* (2013.01)

(58) Field of Classification Search
  USPC ........................................................ 219/69.1
  See application file for complete search history.

(56) References Cited

U.S. PATENT DOCUMENTS

| | | | | |
|---|---|---|---|---|
| 4,341,941 A * | 7/1982 | Tateno | ................ | H05H 1/3405 219/121.48 |
| 4,436,982 A | 3/1984 | Kokura et al. | | |
| 4,882,982 A * | 11/1989 | Muttoni | ................ | A47J 31/0605 99/295 |
| 5,144,110 A * | 9/1992 | Marantz | ................ | H05H 1/42 219/121.48 |
| 5,290,995 A * | 3/1994 | Higgins | ................ | B23K 10/006 219/121.48 |
| 5,767,627 A * | 6/1998 | Siniaguine | ................ | H05H 1/44 219/121.36 |
| 6,040,548 A * | 3/2000 | Siniaguine | ................ | H05H 1/40 219/121.36 |
| 6,222,154 B1 * | 4/2001 | Yamaguchi | ................ | H05H 1/26 219/121.54 |
| 8,354,609 B2 | 1/2013 | Lindsay et al. | | |
| 2006/0186094 A1 * | 8/2006 | Krink | ................ | H05H 1/34 219/121.55 |
| 2010/0155377 A1 * | 6/2010 | Lindsay | ................ | B23K 31/10 219/121.44 |
| 2010/0236420 A1 * | 9/2010 | Remo | ................ | A47J 31/0657 99/299 |
| 2013/0043222 A1 * | 2/2013 | Leiteritz | ................ | B23K 10/00 219/121.48 |
| 2015/0334818 A1 * | 11/2015 | Namburu | ................ | H05H 1/34 219/121.51 |
| 2015/0342019 A1 * | 11/2015 | Peters | ................ | B23K 10/006 219/121.51 |
| 2016/0023295 A1 * | 1/2016 | Lambert | ................ | H05H 1/42 219/121.44 |
| 2016/0057848 A1 * | 2/2016 | Namburu | ................ | B23K 10/00 219/121.52 |
| 2016/0129515 A1 * | 5/2016 | Phillip | ................ | B23K 9/126 219/121.44 |
| 2016/0174353 A1 * | 6/2016 | Mitra | ................ | H05H 1/28 219/121.5 |
| 2018/0007773 A1 * | 1/2018 | Twarog | ................ | H05H 1/34 |
| 2020/0009677 A1 * | 1/2020 | Jogdand | ................ | H05H 1/3405 |
| 2021/0060691 A1 | 3/2021 | Williams | | |

FOREIGN PATENT DOCUMENTS

| | | | |
|---|---|---|---|
| JP | 2013123740 A * | 6/2013 | |
| WO | 2007/016921 A1 | 2/2007 | |

OTHER PUBLICATIONS

Extended European Search Report from Corresponding European Application No. 22185337.0; Dated Feb. 1, 2023; pp. 1-9.

\* cited by examiner

PLASMA CUTTING SYSTEM WITH DUAL ELECTRODE PLASMA ARC TORCH

BACKGROUND OF THE INVENTION

Field of the Invention

The present invention relates to cutting systems that utilize plasma arc torches to make cuts through a workpiece.

Description of Related Art

Plasma arc torches are used to cut parts from workpieces and to cut openings or holes in parts and workpieces. When making perpendicular cuts through a workpiece, the cut edge of the part or hole would ideally be perpendicular to the surface of the workpiece. However, plasma arcs will often leave a slight bevel along the cut edge. For example, the width of the plasma arc at the top of the workpiece can differ slightly from the width of the plasma arc at the bottom of the workpiece. The plasma cutting system may focus the arc vertically in the center or middle of the workpiece, and the width of the plasma arc at the top of the workpiece may be slightly larger than the width of the arc at the bottom of the workpiece. Such an arc will cut a kerf through the workpiece that is wider at the top of the workpiece than the bottom, resulting in a slight bevel along the cut edges. The beveled edge can be removed with additional labor and/or machining, which is undesirable, or be left on the part, which is also undesirable. Thus, minimizing the beveled edge on a plasma-cut surface would be beneficial.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a plasma cutting system. The system includes a plasma cutting power supply that simultaneously outputs both of a first plasma cutting current and a second plasma cutting current. A plasma arc torch is operatively connected to the plasma cutting power supply. The plasma arc torch includes a first cathode that receives the first plasma cutting current, a first electrode electrically connected to the first cathode, a first swirl ring around the first electrode, a second cathode that receives the second plasma cutting current, a second electrode electrically connected to the second cathode and radially offset from the first electrode, and a second swirl ring around the second electrode. The plasma arc torch simultaneously generates a first plasma arc from the first electrode and a second plasma arc from the second electrode during a plasma cutting operation. A gas controller is configured to separately control a flow of a first plasma gas to the first swirl ring and a flow of a second plasma gas flow to the second swirl ring. A torch actuator moves the plasma arc torch during a plasma cutting operation. The torch actuator comprises a motor having a hollow shaft rotor for rotating the plasma arc torch during the plasma cutting operation. A motion controller is operatively connected to the torch actuator to control movements of the plasma arc torch during the plasma cutting operation.

In accordance with another aspect of the present invention, provided is a plasma cutting system. The system includes a plasma cutting power supply that simultaneously outputs both of a first plasma cutting current and a second plasma cutting current. A plasma arc torch is operatively connected to the plasma cutting power supply. The plasma arc torch includes a first cathode that receives the first plasma cutting current, a first electrode electrically connected to the first cathode, a first swirl ring around the first electrode, a second cathode that receives the second plasma cutting current, a second electrode electrically connected to the second cathode and radially offset from the first electrode, and a second swirl ring around the second electrode. The plasma arc torch simultaneously generates a first plasma arc from the first electrode and a second plasma arc from the second electrode during a plasma cutting operation. A gas controller is configured to separately control a flow of a first plasma gas to the first swirl ring and a flow of a second plasma gas flow to the second swirl ring. A torch actuator moves the plasma arc torch during a plasma cutting operation. The torch actuator is configured to rotate the plasma arc torch during the plasma cutting operation to control an angular orientation of the plasma arc torch with respect to a kerf cut through a workpiece. A motion controller is operatively connected to the torch actuator to control movements of the plasma arc torch during the plasma cutting operation.

In accordance with another aspect of the present invention, provided is a plasma cutting method. The method includes providing a plasma arc torch. The plasma arc torch comprises a first input power connection, a second input power connection, an axially extending torch body, a first cathode electrically connected to the first input power connection, a first electrode electrically connected to the first cathode, a first swirl ring around the first electrode, a second cathode electrically connected to the second input power connection, a second electrode electrically connected to the second cathode and radially offset from the first electrode, and a second swirl ring around the second electrode. The method further includes providing a plasma cutting power supply having a first plasma cutting current output operatively connected to the first input power connection, and a second plasma cutting current output operatively connected to the second input power connection. A first plasma arc is generated from the first electrode and a second plasma arc is generated from the second electrode. A kerf is cut through a workpiece by the first plasma arc to create a cut edge. At least a portion of the cut edge is removed by the second plasma arc while cutting the kerf through the workpiece by the first plasma arc.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
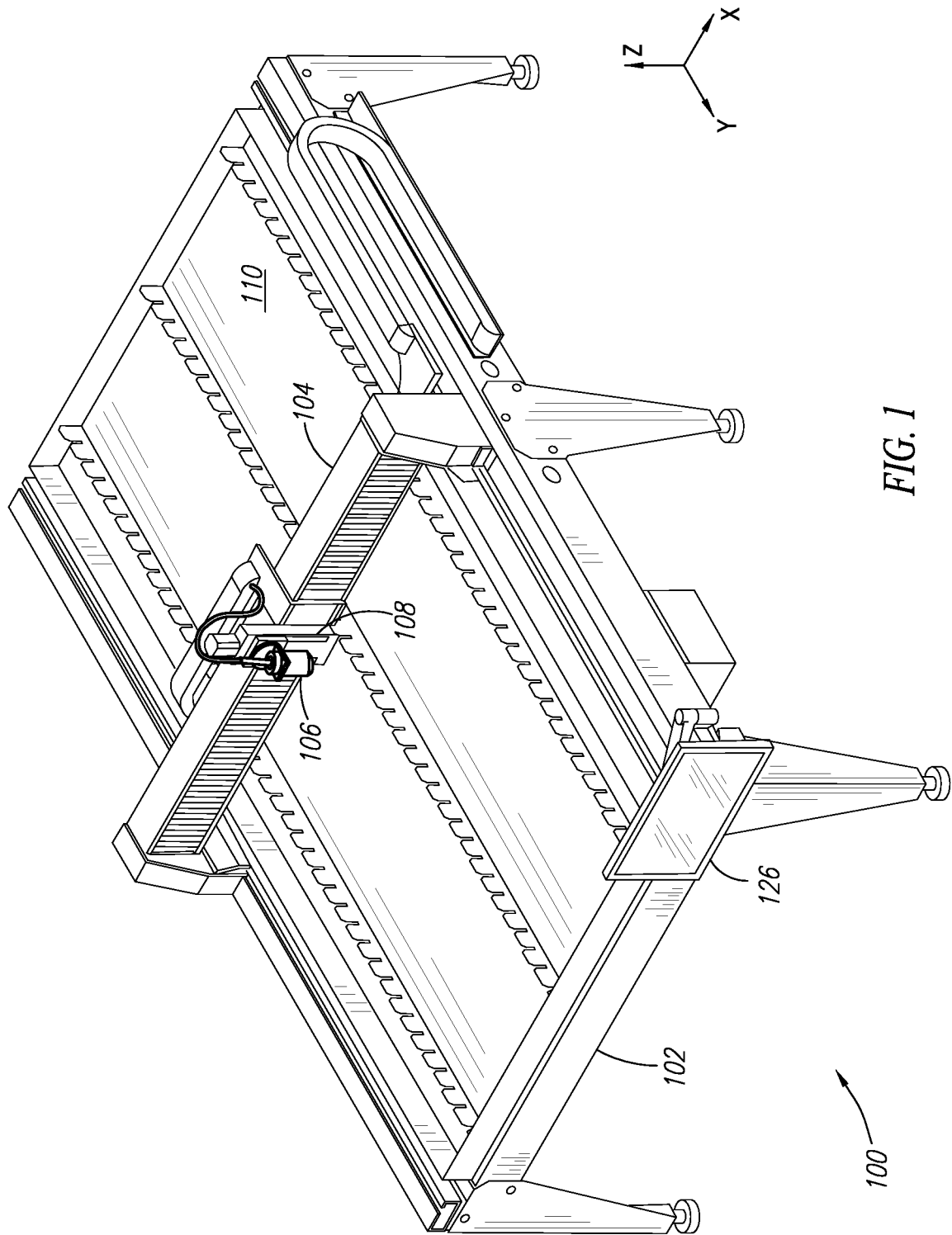
FIG. 1 is a perspective view of a plasma cutting system.

The present invention relates to plasma cutting systems and methods and to plasma arc torches for cutting workpieces using a plasma arc while minimizing any undesired beveling along cut edges, so that the cut edges are substantially smooth and flat. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

Discussed herein are plasma arc torches that can have, among other things, fluid and electrical connections and a handle portion at an upstream end of the torch, and a nozzle, swirl rings and electrodes at a downstream or cutting end of the torch. The term "proximal" as used herein refers to the upstream direction of the torch, toward the end of the torch having the handle portion and any fluid and electrical connections. The term "distal" as used herein refers to the downstream direction of the torch, toward the cutting end of the torch.

Embodiments of the present invention described herein are discussed in the context of a plasma cutting system, and in particular a plasma cutting table. However, other embodiments are not limited to plasma cutting tables. For example, embodiments can be utilized with a plasma cutting robot, such as a robotic arm, and the plasma arc torch and torch holder described herein can be incorporated into an end effector or end of arm tooling for a robot.

FIG. 1 shows an example plasma cutting system. The plasma cutting system includes a plasma cutting table 100. The plasma cutting table 100 has a main body 102 upon which a workpiece, such as a metal sheet or plate, is placed. The plasma cutting table 100 includes a gantry 104 that can move back and forth along the length of the cutting table's main body 102 in a first direction (e.g., in a Y direction). The gantry 104 can move on tracks or rails that extend along the sides of the table. A plasma arc torch 106 is attached to a movable torch carriage 108 that is mounted on the gantry 104. The torch carriage 108 can move back and forth along the gantry 104 in a second direction (e.g., in an X direction) that is perpendicular to the first direction. The plasma cutting table 100 can be programmed to make precise cuts in a workpiece through controlled movements of the torch carriage 108 and gantry 104 in the X and Y directions, respectively. In certain embodiments, the torch carriage 108 can move the plasma cutting torch 106 vertically toward and away from the workpiece (e.g., in a Z direction), so that the torch can be moved in three perpendicular directions. In certain embodiments, the torch carriage 108 can also rotate or tilt the torch 106 in a plane perpendicular to the plane of the table (e.g., in the X-Z plane), to make beveled cuts.

As is known in the art, the plasma cutting table 100 includes a water tray 110 located adjacent the workpiece. During a plasma cutting operation, the water tray 110 is filled with water, and the water can be drained to allow the water chamber to be cleaned to remove accumulated dross and slag.

Figure 2:
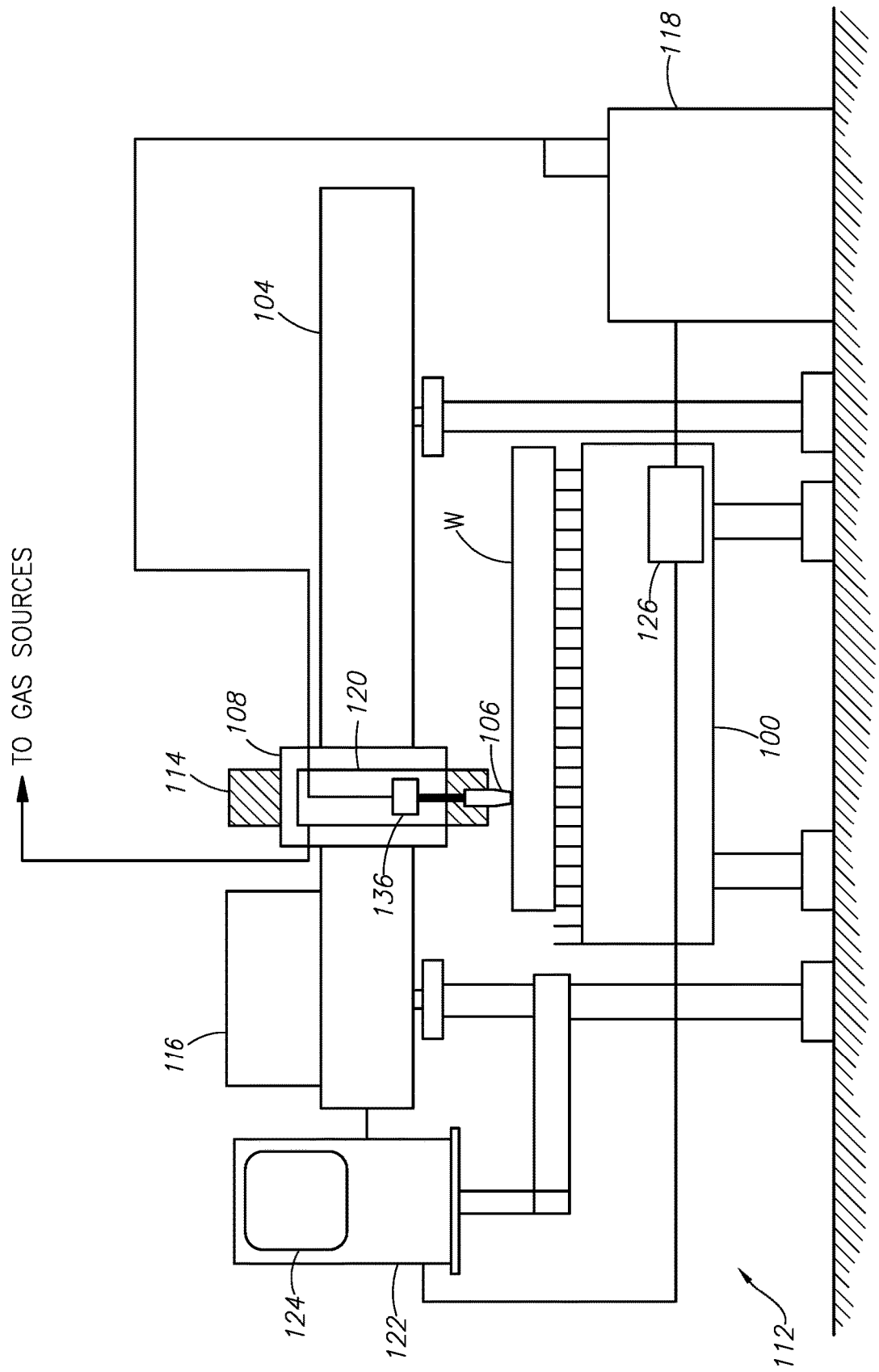
FIG. 2 is a schematic view of a plasma cutting system.

FIG. 2 schematically shows various components of an example plasma cutting system 112. The plasma cutting system 112 includes the plasma cutting table 100 and plasma arc torch 106. The plasma cutting table 100 includes a torch actuator, such as the gantry 104 and torch carriage 108, that moves the torch during a cutting operation. The system 112 can include a torch height controller 114 which can be mounted to the gantry 104. The system 112 can also include a drive system 116 which is used to provide motion to the torch 106 relative to a workpiece W positioned on the table 100. A plasma cutting power supply 118 is coupled to the torch 106 to provide first and second plasma cutting currents used to create two plasma arcs during a plasma cutting operation. The plasma cutting power supply 118 has a first plasma cutting current output and a second plasma cutting current output that are operatively connected to respective input power connections on the plasma arc torch 106 to generate the two plasma arcs. The system 112 can also include a gas console or gas controller 120 that can separately control gas flow rates and/or pressures of two plasma gasses and a shield gas used during the cutting operation. The gas console 120 can also be used to select different gases depending in the cutting operation that is being performed. That is, certain gases may be used for some cutting operations, but would not be used for others. Various gasses can be used for the two plasma gasses and the shield gas, such as air, nitrogen, oxygen, etc.

The plasma cutting system 112 can also include a computer numeric controller (CNC) 122, which can include a user input/display screen or user interface 124. The user interface 124 and controller 122 are used by a user to input and read cutting operational parameters and data, and allow the system 112 to be operated as an automated, programmable cutting system. Various input parameters can be input by the user into the controller 122, via the user interface 124 (or other means) including: torch current, material type, material thickness, cutting speed, torch height, plasma and shield gas composition, etc. The table 100 can also include a user interface 126 that is operatively connected to the CNC and/or the plasma cutting power supply 118. In embodiments employing a robotic arm as the torch actuator rather than a gantry and torch carriage, the CNC can be a robot controller that controls the movements of the robotic arm.

The plasma cutting system 112 can have many different configurations, and embodiments are not limited to that shown in FIG. 2, which is intended to be exemplary.

The motion controller 122, gas controller 120, or plasma cutting power supply 118 can utilize an electronic controller and can include one or more processors. For example, the controllers can include one or more of a microprocessor, a microcontroller, a digital signal processor (DSP), an application specific integrated circuit (ASIC), a field-programmable gate array (FPGA), discrete logic circuitry, or the like. The controllers can further include memory and may store program instructions that cause the controller to provide the functionality ascribed to it herein. The memory may include one or more volatile, non-volatile, magnetic, optical, or electrical media, such as read-only memory (ROM), random access memory (RAM), electrically-erasable programmable ROM (EEPROM), flash memory, or the like. The controllers can further include one or more analog-to-digital (A/D) converters for processing various analog inputs to the controller. The program instructions for the motion controller 122 can include cut charts or nesting software. Such instructions typically include cutting information including instructions for the system 112 when cutting various holes or contours, taking into account the sizes and shapes of the holes/contours and the material being cut. As is generally understood the controllers can allow a user to cut numerous successive holes, contours or a combination of holes and contours in a workpiece without stopping between cuts. For example, the operator can select a cutting program that includes both hole and contour cutting instructions, and the motion controller 122 will determine the order and positioning of the cuts, as well as the various parameters of the cuts based on the user input information.

The controllers can operate in a networked environment using logical and/or physical connections to one or more remote computers. Examples of the remote computers include workstations, server computers, routers, personal computers, and the like. The networked environment can include local area networks (LAN) and/or wide area networks (WAN). Such networking environments are commonplace in offices, enterprise-wide computer networks, intranets and the Internet. When used in a LAN networking environment, the controllers are connected to the local network through a network interface or adapter. When used in a WAN networking environment, the controllers typically include a modem or network interface, or are connected to a communications server on the LAN, or have other means for establishing communications over the WAN, such as the Internet. In a networked environment, program modules implemented by the controllers, or portions thereof, may be stored in a remote memory storage device. It will be appreciated that network connections described herein are exemplary and other means of establishing communications links between devices may be used.

Figure 3:
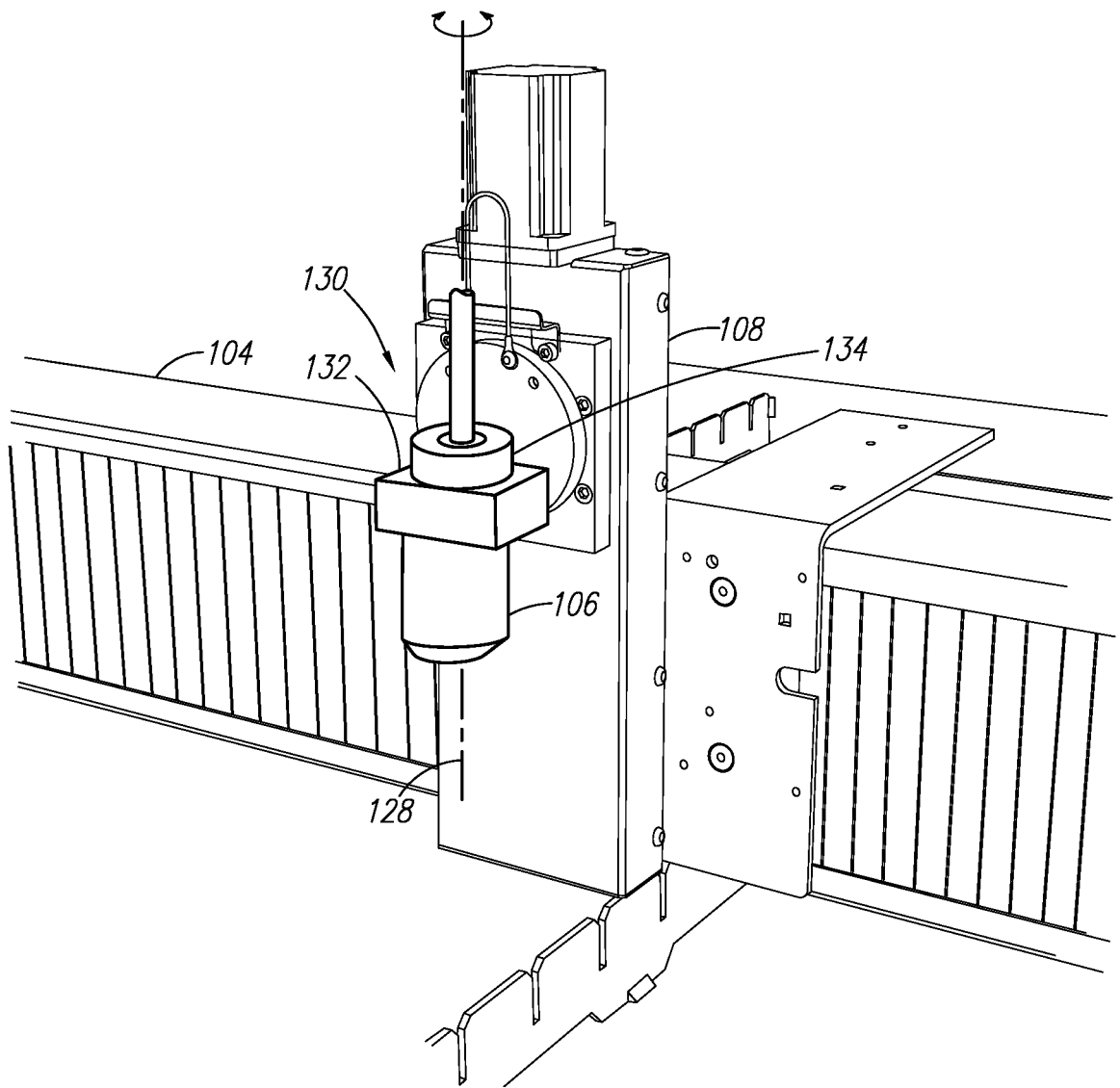
FIG. 3 is a perspective view of a portion of the plasma cutting system.

FIG. 3 shows the plasma cutting torch 106 and torch carriage 108 in more detail. The plasma cutting torch 106 of the present invention is rotated when changing cutting directions, to maintain a constant angular orientation of the torch with respect to the cut edge and the kerf cut through the workpiece. As discussed further below, the torch 106 uses a primary, higher-power arc to cut the kerf through the workpiece, and a trailing secondary, lower-power arc to remove at least a portion of the cut edge created by the primary arc (e.g., remove material such as a bevel from the cut edge). The purpose of the secondary, lower-power arc is to trail the primary arc and square and refine the cut edge created by the primary arc; this can be accomplished by removing a portion of the cut edge or slicing a new cut edge just inside of the cut edge created by the primary arc. The torch 106 is rotated during the cutting operation to maintain the position of the secondary arc along the cut edge. The CNC is programmed to control the movements of the torch 106 in the X and Y directions when cutting a curved portion or otherwise changing directions of the cut, while simultaneously rotating the torch about a longitudinal axis 128 of the torch. The torch 106 is rotated according to the direction of the cut to control the angular orientation of the torch to the kerf and the cut edge, which results in maintaining common orientations and "arc cutting edges" along the cut edge of the workpiece of the two plasma arcs generated by the torch 106.

The torch carriage 108 includes torch holder 130 to which the torch 106 is secured. The torch holder 130 is attached to the torch carriage 108 and is capable of rotating the torch 106 during plasma cutting. In the example embodiment shown, the torch holder 130 includes a motor 132 that rotates the torch 106. In certain embodiments, the motor 132 can rotate the torch 106 through at least 360°, so that the torch can be completely rotated during cutting. The motor 132 can have a hollow shaft rotor 134 to which the torch 106 is attached. In certain embodiments, the torch 106 is mounted within the hollow shaft rotor 134, coaxially with the rotor, so that the rotor rotates with the torch around the axis 128 of the torch. Example motors 132 for rotating the torch 106 include permanent magnet, hollow shaft torque motors, hollow shaft servo motors, hollow shaft stepper motors, and the like. The CNC can control the rotational angle of the torch 106 as desired during plasma cutting via the motor 132. In particular, the CNC can control the rotational angle of the motor 132 and torch 106 so that the angular orientation of the torch with respect to the kerf and cut edges of the workpiece W remains substantially constant during cutting. The motor 132 can include a positional feedback device, such as an encoder, that transmits angular positional data to the CNC. The torch holder 130 can include a bracket that is cantilevered from the torch carriage 108, and a stator of the motor 132 can be secured to an upper surface of the bracket. In other embodiments, the stator itself is cantilevered from the torch carriage 108, and the motor 132 functions as the torch holder. The hollow shaft rotor 134 and/or the torch 106 can include clamping devices or fasteners that secure and axially align the torch within the rotor.

In certain embodiments, the torch 106 can include rotary connectors 136 (FIG. 2) to connect the torch to the power supply, gas console, etc., so that the torch can be rotated without twisting its supply cables and/or hoses. Rotary connectors can be particularly useful if torch rotations exceeding 360° are desired.

Figure 4:
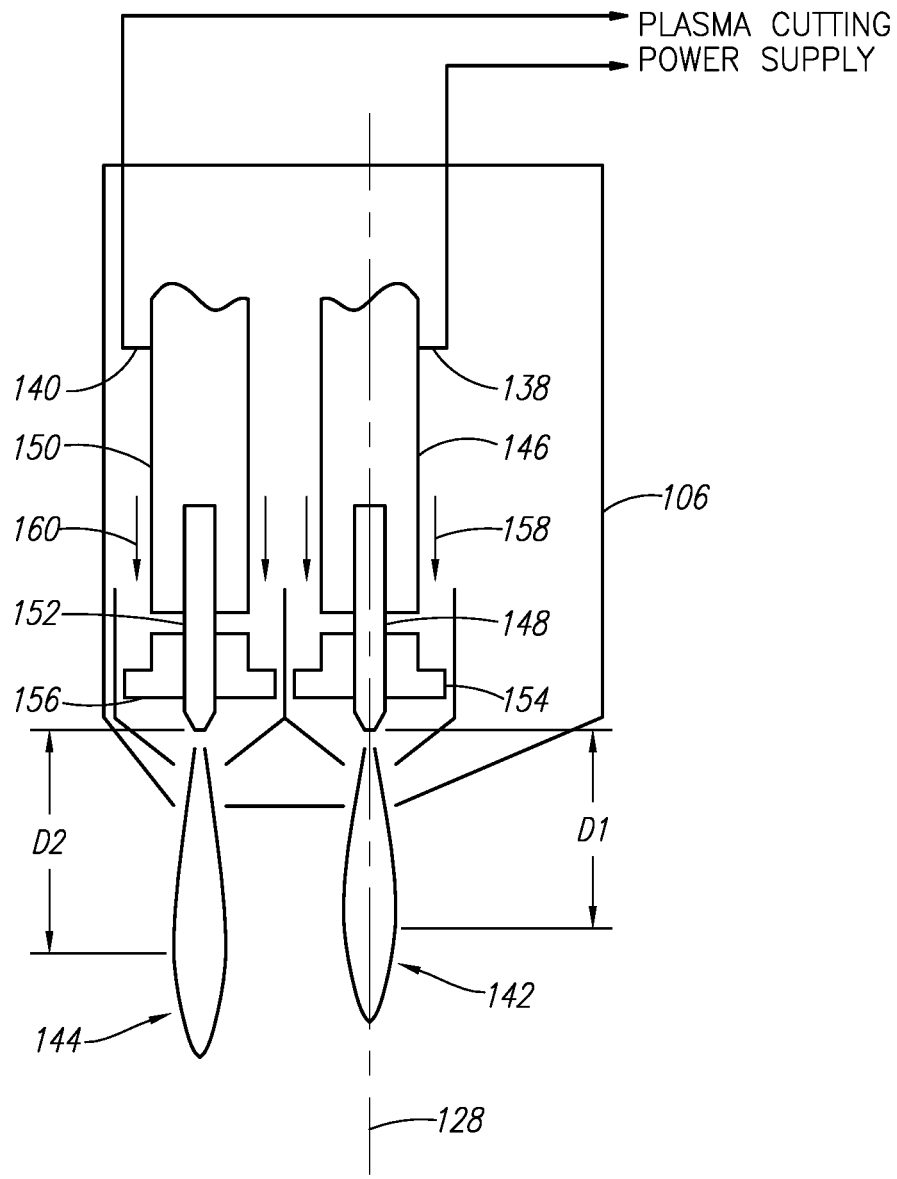
FIG. 4 is a schematic view of an example plasma arc torch.

FIG. 4 is a schematic view of an example plasma arc torch 106 that is capable of generating two plasma arcs simultaneously. The torch 106 has first 138 and second 140 input power connections for receiving a first plasma cutting current and a second plasma cutting current, respectively, from the plasma cutting power supply. The torch 106 generates a primary plasma arc 142 and a secondary plasma arc 144. The current level of the first plasma cutting current is greater than the current level of the second plasma cutting current, and the energy level of the primary plasma arc 142 is greater than the energy level of the secondary plasma arc 144. For example, the first plasma cutting current can be more than twice or more than three times greater than the second cutting current. Example current levels for the first plasma cutting current and the second plasma cutting current are 300A and 80A, respectively. However, various current levels for the first and second plasma cutting currents could be used within the scope of the present invention.

It can be seen that the torch has an axially extending torch body. Radially inward of the torch body, the torch 106 includes a first cathode 146 that receives the first plasma cutting current. A first electrode 148 is electrically connected the first cathode 146 and is used to generate the primary plasma arc 142. The torch 106 also has a second cathode 150 that receives the second plasma cutting current. A second electrode 152 is electrically connected to the second cathode 150 to generate the secondary plasma arc 144. The second cathode 150 and second electrode 152 are radially offset from the first cathode 146 and first electrode 148. In the embodiment shown, the first cathode 146 and first electrode 148 are centered on and extend along the axis 128 of the torch. In other example embodiments, the first cathode 146 and first electrode 148 and the second cathode 150 and second electrode 152 are all radially offset from the axis 128 of the torch. Alternatively, the second cathode 150 and second electrode 152 can be centered on and extend along the axis 128. In certain embodiments, the first cathode 146 and first electrode 148 are parallel with the second cathode 150 and second electrode 152.

The torch further includes a first swirl ring 154 around the first electrode 148, and a second swirl ring 156 around the second electrode 152. The swirl rings 154, 156 swirl respective plasma gas flows 158, 160 for generating the plasma arcs 142, 144. The gas controller in the plasma cutting system can separately or individually control the flow rate and/or pressure of the first plasma gas provided to the first swirl ring 154 and the second plasma gas provided to the second swirl ring 156. The composition of the first plasma gas can be the same as the second plasma gas, or the gasses can be different from each other. In an example embodiment, the first plasma gas is nitrogen and the second plasma gas is oxygen. The use of nitrogen for the first plasma gas will extend the life of the first electrode 148 given there is little to no oxidization. Extending the life of the first electrode 148 will put its usable life closer to that of the second electrode 152, which will last longer given its lower amperage.

Figure 5:
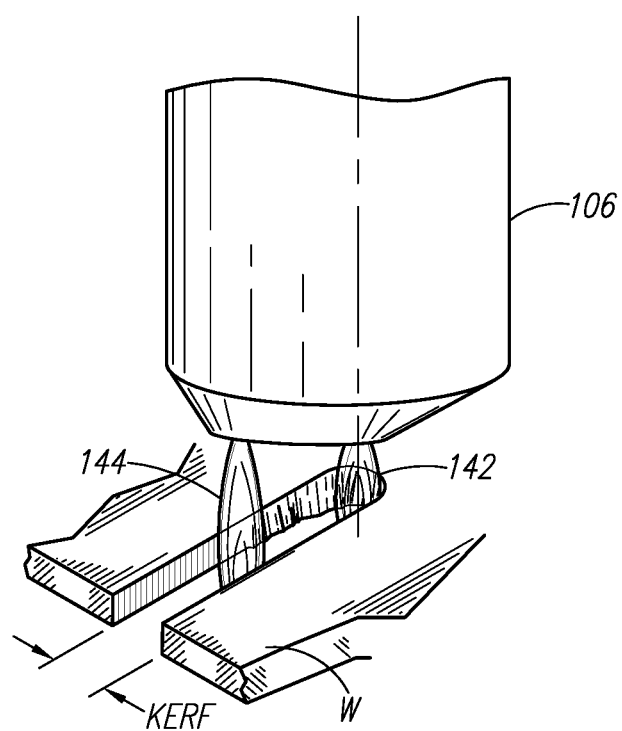
FIG. 5 shows a plasma cutting operation.
Figure 6:
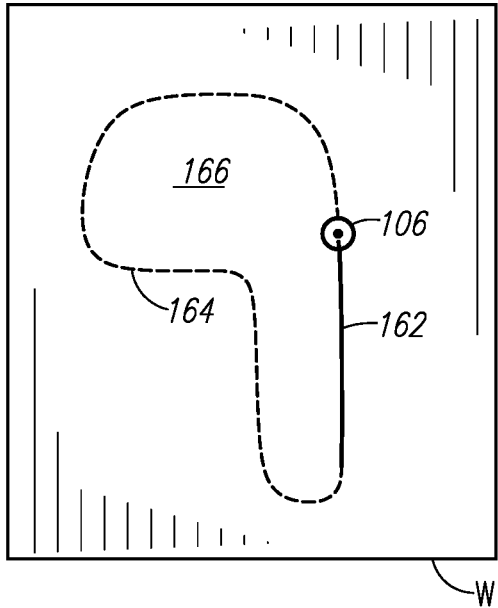
FIG. 6 shows a plasma cutting operation.
Figure 7:
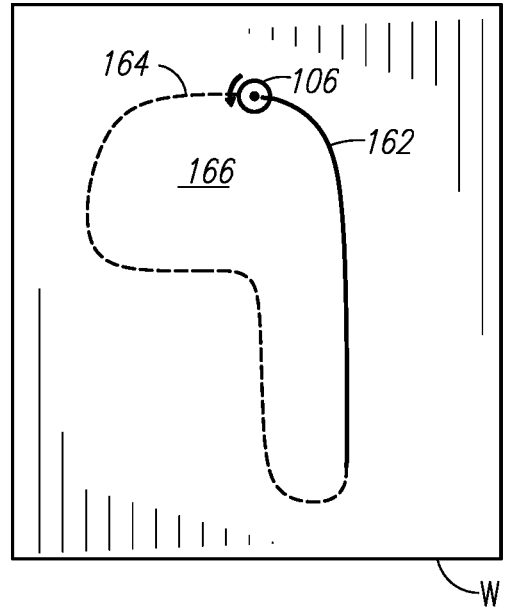
FIG. 7 shows a plasma cutting operation.
Figure 8:
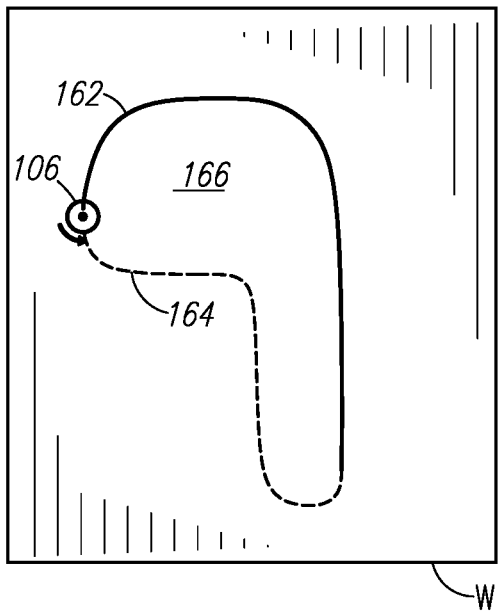
FIG. 8 shows a plasma cutting operation.
Figure 9:
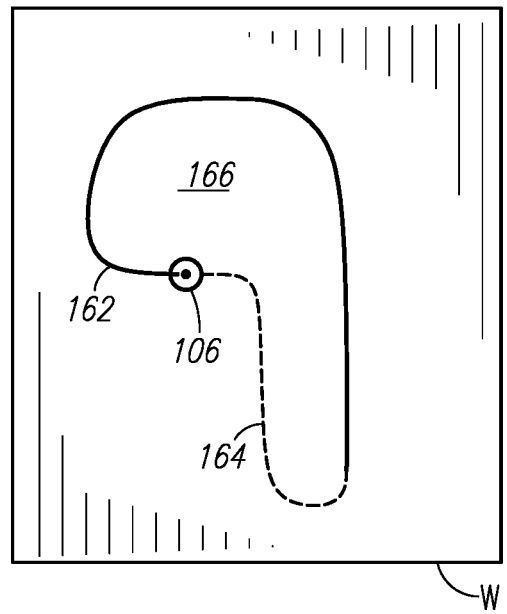
FIG. 9 shows a plasma cutting operation.
Figure 10:
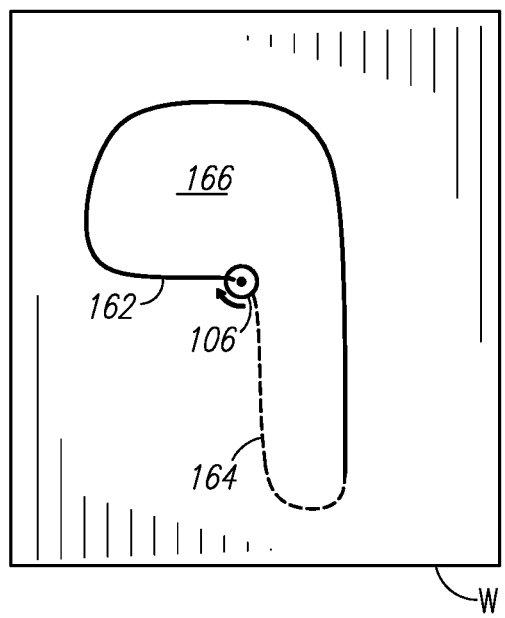
FIG. 10 shows a plasma cutting operation.
Figure 11:
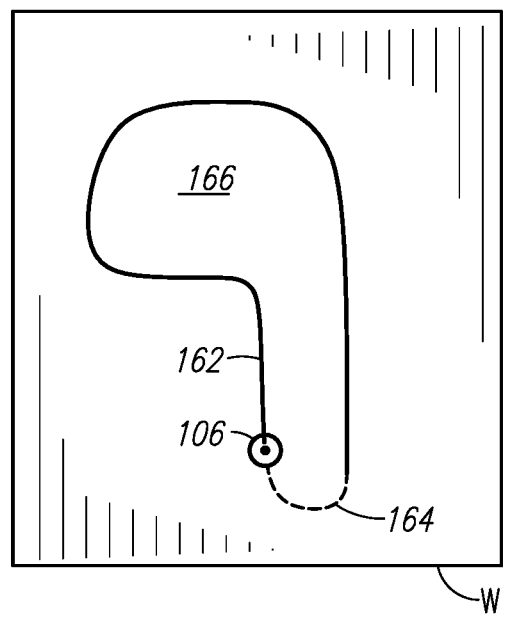
FIG. 11 shows a plasma cutting operation.

FIG. 5 shows an example plasma cutting operation. The purpose of the primary plasma arc 142 is to cut the kerf through the workpiece W. The primary plasma arc 142 is used for mass material removal. The secondary plasma arc 144 trails the primary plasma arc 142 during the cutting operation and removes at least a portion of the cut edge created by the primary plasma arc. The secondary plasma arc 144 refines the cut made by the primary plasma arc 142. The primary plasma arc 142 is focused on the vertical center of the workpiece W and can leave a beveled edge when cutting the kerf. The secondary plasma arc 144 is focused below the center of the workpiece W to square the cut edge by shaving off the bevel and polish the cut surface made by the primary plasma arc 142. As can be seen in FIG. 4, the primary plasma arc 142 has a first focus depth D1 distal of the first electrode 148, and the secondary plasma arc 144 has a second focus depth D2 distal of the second electrode 152. The distance between the second focus depth D2 and the second electrode 152 is greater than the distance between the first focus depth D1 and the first electrode 148. The first focus depth D1 is typically at the vertical center of the workpiece and the second focus depth D2 is just below the vertical center of the workpiece. The focus depths D1, D2 of the plasma arcs 142, 144 can be adjusted by the plasma gas flow rates.

During a plasma cutting operation, the torch actuator rotates the plasma arc torch 106 such that the second electrode 152 and the secondary plasma arc 144 trail the first electrode 148 and primary plasma arc 142 while cutting a part contour or hole. With respect to the cutting direction (e.g., the X-Y direction of torch movement), the secondary plasma arc 144 tracks slightly behind and to the side of the primary plasma arc 142. The degree to which the secondary arc 144 tracks to the side of the primary arc 142 is controlled by rotating the torch 106 via the hollow shaft rotor. Whether the secondary plasma arc 144 tracks on the left or right side of the primary arc will depend on the direction of torch movement (e.g., clockwise or counterclockwise in the X-Y plane) and whether a part contour or hole is being cut. In certain embodiments, the plasma cutting system cuts part contours and holes through parts in a particular direction (e.g., clockwise or counterclockwise) of X-Y torch movement. Using counterclockwise X-Y torch movements as an example, when cutting a part contour, the secondary, trailing arc 144 will track to the left of the primary, leading arc 142 when two arcs are viewed from the trailing arc toward the primary arc as can be seen in FIG. 5. This allows the secondary arc 144 to remove the bevel from the outer edge of the part contour as the torch 106 is moved in a counterclockwise direction in the X-Y plane. When cutting a hole through a part, the torch 106 will be rotated slightly counterclockwise about the torch axis by the torch holder, so that the secondary, trailing arc 144 will track to the right of the primary, leading arc 142. This allows the secondary arc 144 to remove a bevel from the edge of the hole as the torch 106 is moved counterclockwise in the X-Y plane to cut the hole.

FIGS. 6-11 show an example plasma cutting operation during which the torch 106 is rotated to maintain the angular orientation of the torch with respect to a kerf 162 cut through the workpiece W. The kerf 162 is shown in solid line in FIGS. 6-11. The remaining uncut portion 164 of the part 166 to be cut from the workpiece W is shown in dashed lines. The torch 106 includes an orientation mark near the kerf 162 to help illustrate how the angular orientation of the torch changes along the cutting path. It can be seen in FIGS. 6-8 that as the torch 106 transitions from cutting a straight portion of the part 166 to a curved portion of the part, the torch is rotated in a first direction (e.g., counterclockwise). Between FIGS. 9 and 10, the torch 106 is rotated in a second direction (e.g., clockwise) to cut another curved portion of the part 166. As the torch 106 moves along the contour of the part 166, the orientation mark on the torch 106 remains adjacent the kerf 162 due to the torch being rotated by the hollow shaft rotor on the torch holder. The torch 106 can be rotated clockwise and counterclockwise as needed, based on the shape of the cut to be made, and based on whether a part or hole is being cut. Rotating the torch 106 during the plasma cutting operation maintains the proper tracking of the secondary plasma arc with respect to the primary plasma arc along the trajectory of the cut. The torch 106 is rotated to keep both arcs tangential with the direction of cut. The motion controller can base trajectory planning on the secondary arc but also use the primary arc for checking against potential interferences.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A plasma cutting system, comprising:
a plasma cutting power supply that simultaneously outputs both of a first plasma cutting current and a second plasma cutting current;
a plasma arc torch operatively connected to the plasma cutting power supply, wherein the plasma arc torch comprises:
a first cathode that receives the first plasma cutting current;
a first electrode electrically connected to the first cathode;
a first swirl ring around the first electrode;
a second cathode that receives the second plasma cutting current;
a second electrode electrically connected to the second cathode and radially offset from the first electrode; and
a second swirl ring around the second electrode,
wherein the plasma arc torch simultaneously generates a first plasma arc from the first electrode and a second plasma arc from the second electrode during a plasma cutting operation;
a gas controller configured to separately control a flow of a first plasma gas to the first swirl ring and a flow of a second plasma gas flow to the second swirl ring;
a torch actuator that moves the plasma arc torch during the plasma cutting operation, wherein the torch actuator comprises a motor having a hollow shaft rotor for rotating the plasma arc torch during the plasma cutting operation; and
a motion controller operatively connected to the torch actuator to control movements of the plasma arc torch during the plasma cutting operation.

2. The plasma cutting system of claim 1, wherein a current level of the first plasma cutting current is greater than a current level of the second plasma cutting current.

3. The plasma cutting system of claim 1, wherein a composition of the first plasma gas is different from a composition of the second plasma gas.

4. The plasma cutting system of claim 1, wherein the first plasma gas is nitrogen and the second plasma gas is oxygen.

5. The plasma cutting system of claim 1, wherein the torch actuator rotates the plasma arc torch such that the second electrode and the second plasma arc trail the first electrode and first plasma arc during the plasma cutting operation.

6. The plasma cutting system of claim 5, wherein the second plasma arc removes a bevel from a cut edge created by the first plasma arc during the plasma cutting operation.

7. The plasma cutting system of claim 5, wherein the second plasma arc removes material from a cut edge created by the first plasma arc during the plasma cutting operation.

8. The plasma cutting system of claim 7, wherein the motion controller is configured to control the movements of the plasma arc torch to cut a curve portion through a workpiece while simultaneously rotating the plasma arc torch about an axis of the plasma arc torch, so as to maintain common cutting edges of the first plasma arc and the second plasma arc along the curve portion.

9. The plasma cutting system of claim 1, wherein the first electrode is centered on and extends along an axis of the plasma arc torch.

10. The plasma cutting system of claim 9, wherein the first electrode and the second electrode are parallel with each other.

11. The plasma cutting system of claim 1, wherein the first plasma arc has a first focus depth distal of the first electrode, and the second plasma arc has a second focus depth distal of the second electrode, wherein a distance between the second focus depth and the second electrode is greater than a distance between the first focus depth and the first electrode.

12. A plasma cutting system, comprising:
a plasma cutting power supply that simultaneously outputs both of a first plasma cutting current and a second plasma cutting current;
a plasma arc torch operatively connected to the plasma cutting power supply, wherein the plasma arc torch comprises:
a first cathode that receives the first plasma cutting current;
a first electrode electrically connected to the first cathode;
a first swirl ring around the first electrode;
a second cathode that receives the second plasma cutting current;
a second electrode electrically connected to the second cathode and radially offset from the first electrode; and
a second swirl ring around the second electrode,
wherein the plasma arc torch simultaneously generates a first plasma arc from the first electrode and a second plasma arc from the second electrode during a plasma cutting operation;
a gas controller configured to separately control a flow of a first plasma gas to the first swirl ring and a flow of a second plasma gas flow to the second swirl ring;
a torch actuator that moves the plasma arc torch during the plasma cutting operation, wherein the torch actuator is configured to rotate the plasma arc torch during the plasma cutting operation to control an angular orientation of the plasma arc torch with respect to a kerf cut through a workpiece; and
a motion controller operatively connected to the torch actuator to control movements of the plasma arc torch during the plasma cutting operation.

13. The plasma cutting system of claim 12, wherein a current level of the first plasma cutting current is greater than a current level of the second plasma cutting current, and a composition of the first plasma gas is different from a composition of the second plasma gas.

14. The plasma cutting system of claim 12, wherein the first plasma gas is nitrogen and the second plasma gas is oxygen.

15. The plasma cutting system of claim 12, wherein the torch actuator rotates the plasma arc torch such that the second electrode and the second plasma arc trail the first electrode and first plasma arc during the plasma cutting operation, and wherein the second plasma arc removes material from a cut edge created by the first plasma arc during the plasma cutting operation.

16. The plasma cutting system of claim 15, wherein the motion controller is configured to control the movements of the plasma arc torch to cut a curve portion through the workpiece while simultaneously rotating the plasma arc torch about an axis of the plasma arc torch, so as to maintain common cutting edges of the first plasma arc and the second plasma arc along the curve portion.

17. The plasma cutting system of claim 12, wherein the first plasma arc has a first focus depth distal of the first electrode, and the second plasma arc has a second focus depth distal of the second electrode, wherein a distance between the second focus depth and the second electrode is greater than a distance between the first focus depth and the first electrode.

* * * * *